United States Patent
Yanagisawa et al.

(10) Patent No.: US 11,073,753 B2
(45) Date of Patent: *Jul. 27, 2021

(54) PROJECTION OPTICAL SYSTEM, PROJECTION-TYPE IMAGE DISPLAY DEVICE, AND IMAGING DEVICE

(71) Applicant: SEIKO EPSON CORPORATION, Tokyo (JP)

(72) Inventors: Hirotaka Yanagisawa, Azumino (JP); Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,447

(22) Filed: Feb. 28, 2020

(65) Prior Publication Data

US 2020/0278600 A1    Sep. 3, 2020

(30) Foreign Application Priority Data

Mar. 1, 2019   (JP) .............................. JP2019-037327

(51) Int. Cl.
*G03B 21/28* (2006.01)
*G03B 21/14* (2006.01)
*G03B 21/44* (2006.01)

(52) U.S. Cl.
CPC ........... *G03B 21/28* (2013.01); *G03B 21/145* (2013.01); *G03B 21/44* (2013.01)

(58) Field of Classification Search
CPC ...... G03B 21/28; G03B 21/53; G03B 21/142; G03B 21/145; G03B 21/147;
(Continued)

(56) References Cited

U.S. PATENT DOCUMENTS

2004/0174611 A1    9/2004    Hatakeyama
2009/0066919 A1    3/2009    Fujita et al.
(Continued)

FOREIGN PATENT DOCUMENTS

JP    2010-020344 A    1/2010
JP    2019-133061 A    8/2019

OTHER PUBLICATIONS

Dec. 28, 2020 Office Action Issued in U.S. Appl. No. 16/804,533.
(Continued)

*Primary Examiner* — Sultan Chowdhury
(74) *Attorney, Agent, or Firm* — Oliff PLC

(57) ABSTRACT

A projection optical system has first and second optical systems disposed in order from a demagnification side toward a magnification side. An intermediate image is formed between demagnification-side and magnification-side imaging surfaces. The second optical system is an optical element having first transmission, reflecting, and second transmission surfaces in order from the demagnification toward the magnification sides. The first transmission and reflecting surfaces are located at one side with respect to an optical axis. The second transmission surface is located at the other side with respect to the optical axis. The reflecting surface has a concavely curved surface shape. The second transmission surface has a convexly curved surface shape protruding toward the magnification side. The optical element has a first member and a second member different in refractive index from the first member. A bonding surface between the first member and the second member has a curved surface shape.

20 Claims, 14 Drawing Sheets

(58) Field of Classification Search
CPC ...... G03B 21/208; G02B 13/06; G02B 13/16; G02B 13/18; G02B 13/22; G02B 13/0065; G02B 13/0095; G02B 17/00; G02B 17/08; G02B 17/0828; G02B 17/0844; G02B 17/0848; G02B 17/0852; G02B 17/0896
See application file for complete search history.

(56) References Cited

U.S. PATENT DOCUMENTS

| | | |
|---|---|---|
| 2011/0038039 A1 | 2/2011 | Takaura et al. |
| 2014/0126045 A1 | 5/2014 | Tatsuno et al. |
| 2015/0370048 A1 | 12/2015 | Takano |
| 2016/0370692 A1* | 12/2016 | Ode ........................ H04N 9/315 |
| 2017/0059971 A1 | 3/2017 | Takano et al. |
| 2018/0003934 A1* | 1/2018 | Takano .................. G02B 17/08 |
| 2018/0246302 A1* | 8/2018 | Minefuji ............ G02B 17/0828 |
| 2019/0049707 A1 | 2/2019 | Okada |

OTHER PUBLICATIONS

Dec. 28, 2020 Office Action issued in U.S. Appl. No. 16/804,430.
Apr. 21, 2021 Notice of Allowance issued in U.S. Appl. No. 16/804,430.
May 3, 2021 Notice of Allowance Issued in U.S. Appl. No. 161804,533.

* cited by examiner

PROJECTION OPTICAL SYSTEM, PROJECTION-TYPE IMAGE DISPLAY DEVICE, AND IMAGING DEVICE

The present application is based on, and claims priority from JP Application Serial Number 2019-037327, filed Mar. 1, 2019, the disclosure of which is hereby incorporated by reference herein in its entirety.

BACKGROUND

1. Technical Field

The present disclosure relates to a projection optical system provided with a reflecting surface shaped like a concavely curved surface at a magnification side of an intermediate image, a projection-type image display device provided with the projection optical system, and an imaging device provided with the projection optical system.

2. Related Art

In JP-A-2010-20344 (Document 1), there is described a projection-type image display device for projecting a projection image formed by an image formation section with a projection optical system in an enlarged manner. The projection optical system in Document 1 is constituted by a first optical system and a second optical system disposed in sequence from a demagnification side toward a magnification side. The first optical system is provided with a refracting optical system. The second optical system is formed of a reflecting mirror provided with a reflecting surface shaped like a concavely curved surface. The image formation section is provided with a light source and a light valve. The image formation section forms the projection image on a demagnification-side imaging surface of the projection optical system. The projection optical system forms an intermediate image between the first optical system and the reflecting surface, and then projects a final image on a screen disposed on a magnification-side imaging surface.

In the projection optical system in Document 1, when decreasing the projection distance, the intermediate image located on the demagnification side of the reflecting surface is tilted toward a direction along an optical axis of the first optical system. Here, the intermediate image enlarges as the intermediate image is tilted. When the intermediate image enlarges, there arises the necessity of enlarging the reflecting surface located at the magnification side of the intermediate image. Therefore, in the projection optical system provided only with a reflecting mirror shaped like a concavely curved surface at the magnification side of the intermediate image, there is a problem that the reflecting mirror is apt to grow in size when shortening the projection distance.

SUMMARY

An aspect of the present disclosure is directed to a projection optical system including a first optical system, and a second optical system, wherein the first optical system and the second optical system are disposed in sequence from a demagnification side toward a magnification side, an intermediate image is formed between a demagnification-side imaging surface and a magnification-side imaging surface, the second optical system is an optical element having a first transmission surface, a reflecting surface, and a second transmission surface in sequence from the demagnification side toward the magnification side, the first transmission surface and the reflecting surface are located at one side of a virtual axis set in advance, the second transmission surface is located at the other side of the virtual axis, the reflecting surface has a concavely curved surface shape, the second transmission surface has a convexly curved surface shape protruding toward the magnification side, the optical element has a first member portion and a second member portion different in refractive index from the first member portion on an optical path of a ray passing through the optical element, and a bonding surface between the first member portion and the second member portion has a curved surface shape.

DESCRIPTION OF AN EXEMPLARY EMBODIMENT

A projection optical system according to the present embodiment of the present disclosure and a projection-type image display device equipped with the projection optical system will hereinafter be described in detail with reference to the drawings.

Projection-Type Image Display Device

Figure 1:
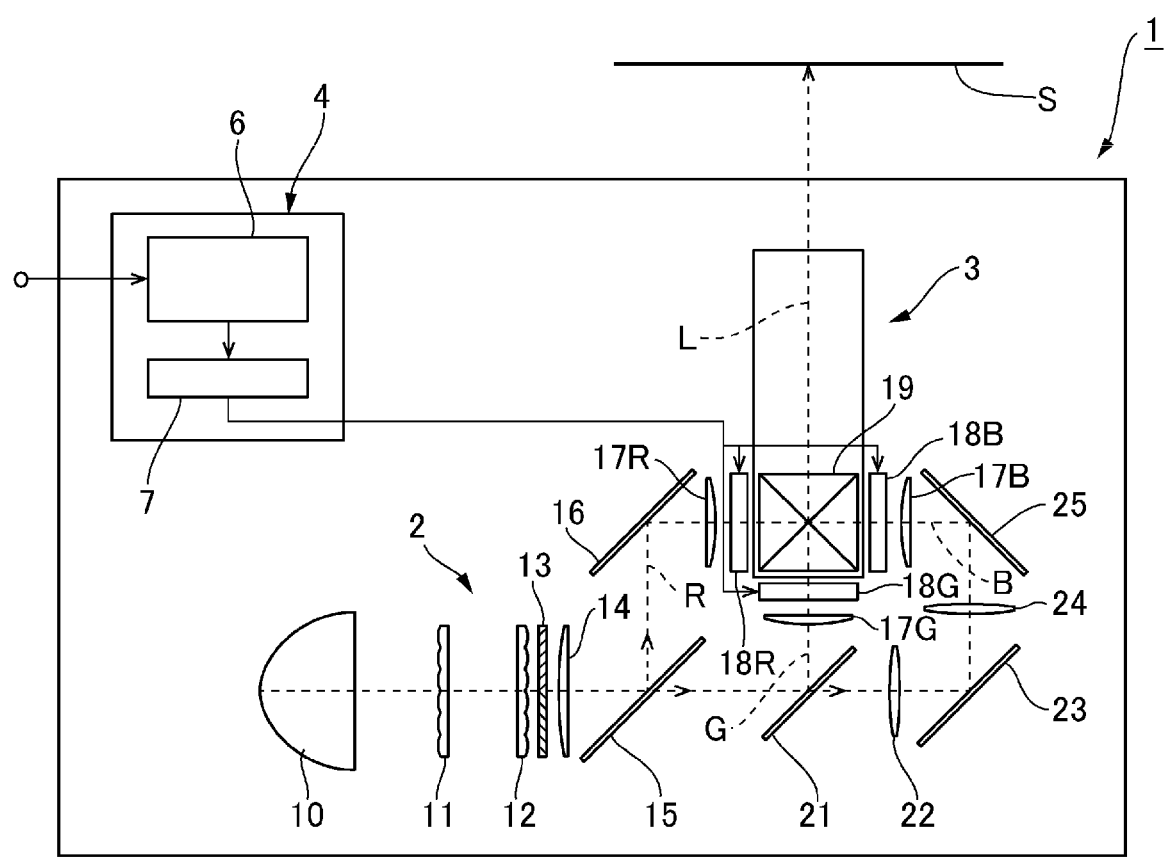
FIG. 1 is a schematic configuration diagram of a projection-type image display device equipped with a projection optical system.

FIG. 1 is a schematic configuration diagram of a projection-type image display device equipped with the projection optical system according to the present disclosure. As shown in FIG. 1, the projection-type image display device 1 is provided with an image formation section 2 for generating image light to be projected on a screen S, a projection optical system 3 for projecting the image light in an enlarged manner, and a control section 4 for controlling an operation of the image formation section 2.

Image Light Generation Optical System and Control Section

The image formation section 2 is provided with a light source 10, a first integrator lens 11, a second integrator lens 12, a polarization conversion element 13, and a superimposing lens 14. The light source 10 is formed of, for example, a super-high pressure mercury lamp or a solid-state light source. The first integrator lens 11 and the second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding one of the lens elements of the second integrator lens 12.

The polarization conversion element 13 converts the light from the second integrator lens 12 into predetermined linearly polarized light. The superimposing lens 14 superimposes the images of the respective lens elements of the first integrator lens 11 on the display area of each of a liquid crystal panel 18R, a liquid crystal panel 18G, and a liquid crystal panel 18B described later via the second integrator lens 12.

Further, the image formation section 2 is provided with a first dichroic mirror 15, a reflecting mirror 16 and a field lens 17R, and the liquid crystal panel 18R. The first dichroic mirror 15 reflects R light as a part of the light beam having entered the first dichroic mirror 15 from the superimposing lens 14, and transmits G light and B light each of which is a part of the light beam having entered the first dichroic mirror 15 from the superimposing lens 14. The R light having been reflected by the first dichroic mirror 15 enters the liquid crystal panel 18R via the reflecting mirror 16 and the field lens 17R. The liquid crystal panel 18R modulates the R light in accordance with an image signal to thereby form a red projection image.

Further, the image formation section 2 is provided with a second dichroic mirror 21, a field lens 17G, and the liquid crystal panel 18G. The second dichroic mirror 21 reflects the G light as a part of the light beam from the first dichroic mirror 15, and transmits the B light as a part of the light beam from the first dichroic mirror 15. The G light having been reflected by the second dichroic mirror 21 enters the liquid crystal panel 18G via the field lens 17G. The liquid crystal panel 18G is an image display element. The liquid crystal panel 18G modulates the G light in accordance with the image signal to thereby form a green projection image.

Further, the image formation section 2 is provided with a relay lens 22, a reflecting mirror 23, a relay lens 24, a reflecting mirror 25 and a field lens 17B, and the liquid crystal panel 18B. The B light having been transmitted through the second dichroic mirror 21 enters the liquid crystal panel 18B via the relay lens 22, the reflecting mirror 23, the relay lens 24, the reflecting mirror 25, and the field lens 17B. The liquid crystal panel 18B is the image display element. The liquid crystal panel 18B modulates the B light in accordance with the image signal to thereby form a blue projection image.

The liquid crystal panel 18R, the liquid crystal panel 18G, and the liquid crystal panel 18B surround a cross dichroic prism 19 from three directions. The cross dichroic prism 19 is a light combining prism, and combines the light modulated by the respective liquid crystal panels 18R, 18G and 18B with each other to generate the image light.

The projection optical system 3 projects the image light (the projection images formed by the respective liquid crystal panels 18R, 18G, and 18B) combined by the cross dichroic prism 19 on the screen S in an enlarged manner.

The control section 4 is provided with an image processing section 6 to which an external image signal such as a video signal is input, and a display drive section 7 for driving the liquid crystal panel 18R, the liquid crystal panel 18G, and the liquid crystal panel 18B based on the image signals output from the image processing section 6.

The image processing section 6 converts the image signal input from external equipment into the image signals including the tones and so on of the respective colors. The display drive section 7 makes the liquid crystal panel 18R, the liquid crystal panel 18G, and the liquid crystal panel 18B operate based on the projection image signals of the respective colors output from the image processing section 6. Thus, the image processing section 6 displays the projection images corresponding to the image signals on the liquid crystal panel 18R, the liquid crystal panel 18G, and the liquid crystal panel 18B, respectively.

Projection Optical System

Then, the projection optical system 3 will be described. A practical example will hereinafter be described as a configuration example of the projection optical system 3 to be installed in the projection-type image display device 1.

Practical Example

Figure 2:
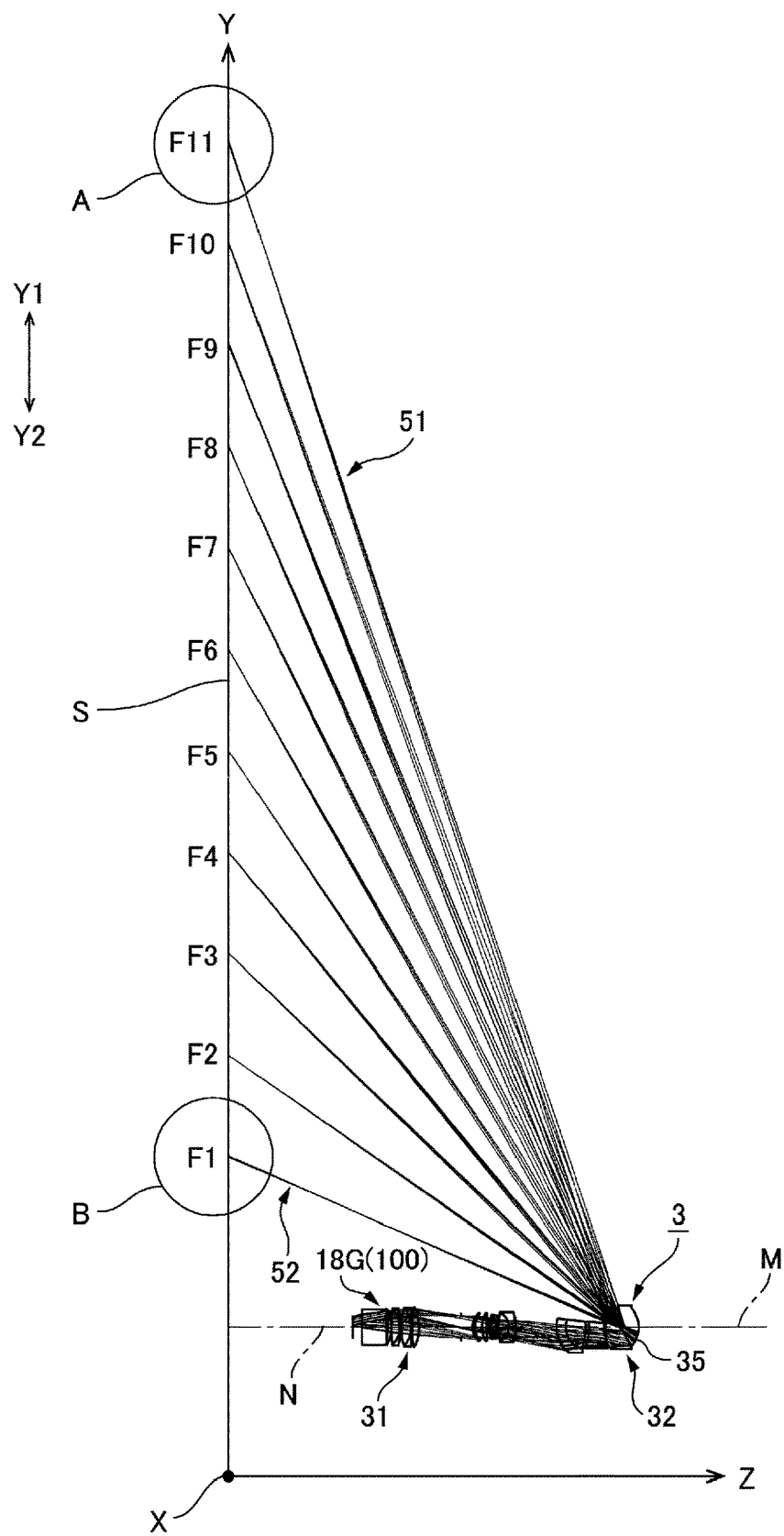
FIG. 2 is a ray chart schematically showing the whole of the projection optical system.
Figure 3:
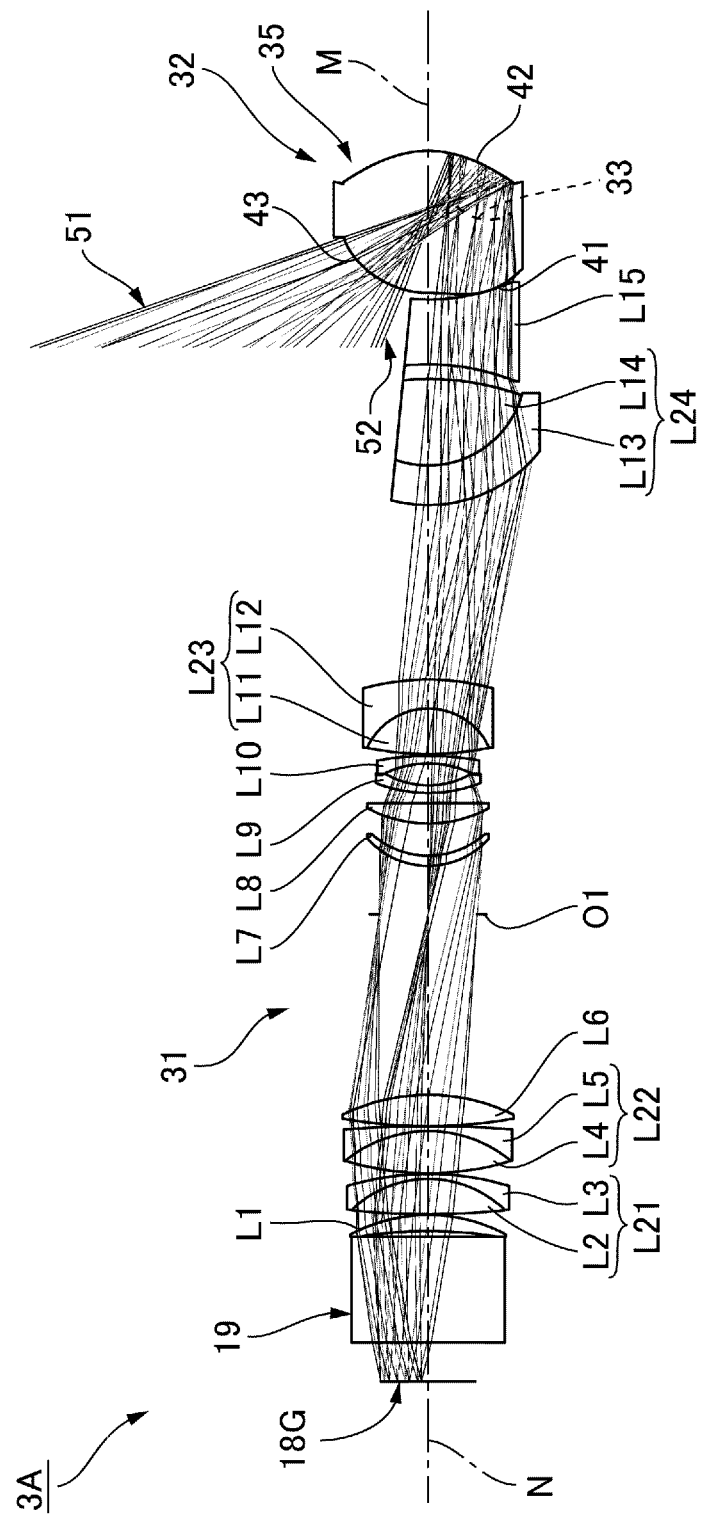
FIG. 3 is a ray chart of a projection optical system in a practical example.
Figure 4:
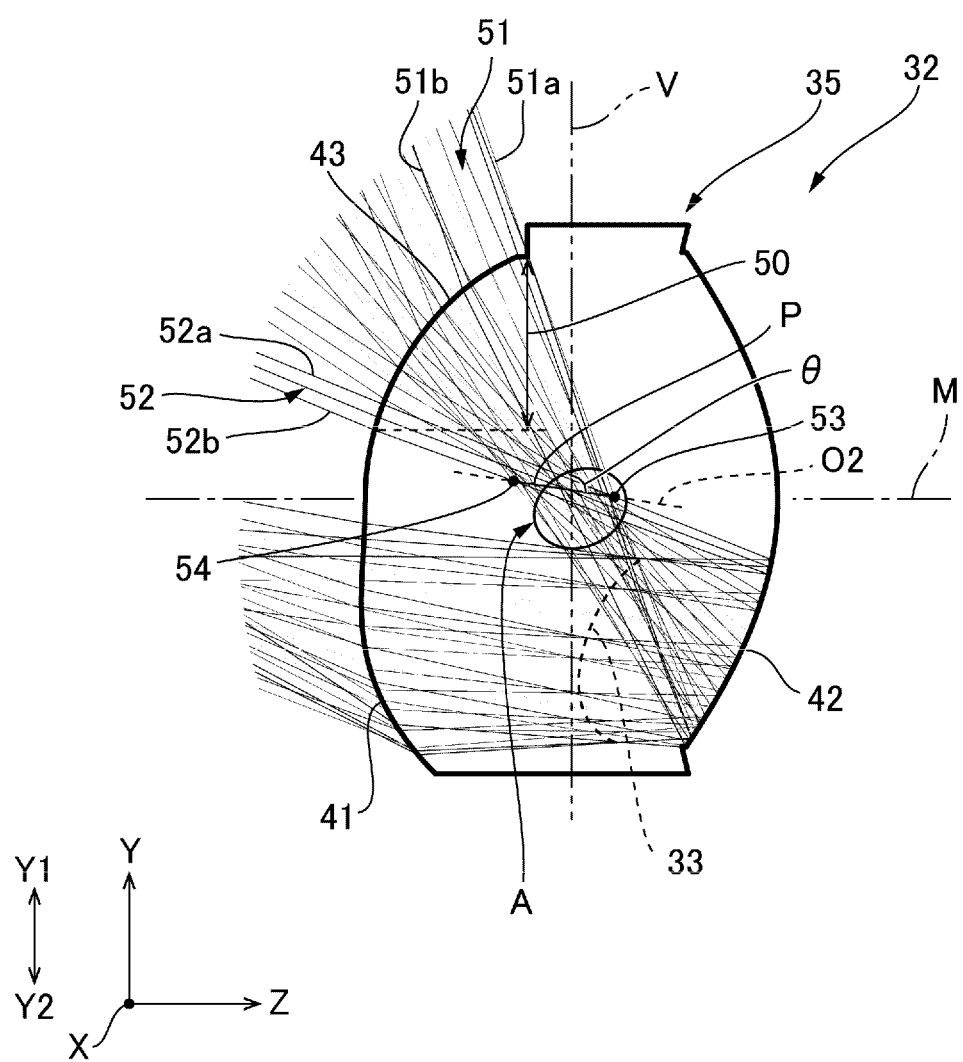
FIG. 4 is a ray chart of a second optical system.
Figure 5:
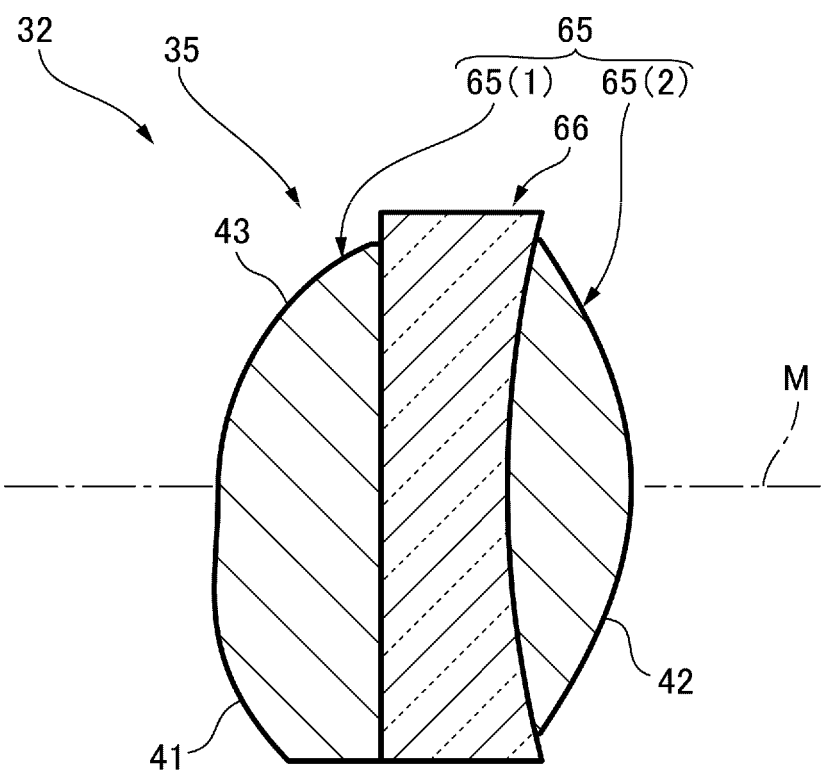
FIG. 5 is an explanatory diagram of a material of an optical element constituting the second optical system.
Figure 5:
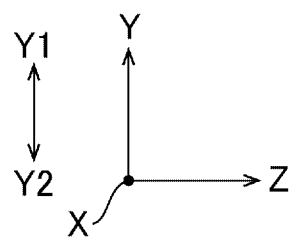

FIG. 2 is a ray chart schematically showing the whole of the projection optical system 3 according to the present disclosure. FIG. 2 schematically shows eleven light beams F1 through F11 which reach the screen S from the projection optical system 3. The light beam F1 is a light beam which reaches the position where the image height is the lowest. The light beam F11 is a light beam which reaches the position where the image height is the highest. The light beams F2 through F10 are light beams which reach respective height positions between the light beam F1 and the light beam F11. FIG. 3 is a ray chart of the projection optical system of the practical example. FIG. 4 is a ray chart of a second optical system. FIG. 5 is an explanatory diagram of a material of an optical element constituting the second optical system.

As shown in FIG. 2, the projection optical system 3A according to the present example is constituted by a first optical system 31 and a second optical system 32 disposed in sequence from a demagnification side toward a magnification side. As shown in FIG. 3 and FIG. 4, the projection optical system 3A forms an intermediate image 33 between a demagnification-side imaging surface and a magnification-side imaging surface. In the present example, the intermediate image 33 is formed inside the second optical system 32. It should be noted that the intermediate image 33 is not required to be formed inside the second optical system 32.

The first optical system 31 is a refracting optical system provided with a plurality of lenses. In the present example, the first optical system 31 is provided with fifteen lenses. The second optical system 32 is formed of a single optical element 35. The intermediate image 33 is formed inside the optical element 35.

In the demagnification-side imaging surface, there are disposed the liquid crystal panel 18R, the liquid crystal panel 18G, and the liquid crystal panel 18B of the image formation section 2. In FIG. 2 and FIG. 3, there is shown the liquid crystal panel 18G as one of the three liquid crystal panels 18R, 18G, and 18B. The liquid crystal panel 18R, the liquid crystal panel 18G, and the liquid crystal panel 18B each form the projection image at one side in an optical axis N of the first optical system 31 in the demagnification-side imaging surface. On the magnification-side imaging surface, there is disposed the screen S.

As shown in FIG. 3, the first optical system 31 has the cross dichroic prism 19, and the fifteen lenses L1 through L15. The first lens L1 through the fifteenth lens L15 are arranged in this order from the demagnification side toward the magnification side. In the present example, the second lens L2 and the third lens L3 are bonded to each other to form a first cemented lens L21. The fourth lens L4 and the fifth lens L5 are bonded to each other to form a second cemented lens L22. The eleventh lens L11 and the twelfth lens L12 are bonded to each other to form a third cemented lens L23. The thirteenth lens L13 and the fourteenth lens L14 are bonded to each other to form a fourth cemented lens L24. An aperture O1 is disposed between the seventh lens L7 and the eighth lens L8. It should be noted that the first optical system 31 is not provided with the cross dichroic prism 19 in some cases.

As shown in FIG. 4, the optical element 35 has a first transmission surface 41, a reflecting surface 42, and a second transmission surface 43 in sequence from the demagnification side toward the magnification side. In the following description, three axes perpendicular to each other are defined as an X axis, a Y axis, and a Z axis for the sake of convenience. Further, a direction in which the first transmission surface 41 and the reflecting surface 42 are arranged is defined as a Z-axis direction, one side of the Y axis is defined as an upper side Y1, the other side of the Y axis is defined as a lower side Y2, and a plane perpendicular to the X axis and including the Y axis and the Z axis is defined as a Y-Z plane. Therefore, each of FIG. 1 through FIG. 5 shows when viewed from a direction parallel to the X axis. As shown in FIG. 2, the optical axis N of the first optical system 31 extends in the Z-axis direction. The image formation section 2 forms the projection image at the upper side Y1 in the optical axis N of the first optical system 31.

The intermediate image 33 is formed at the lower side Y2 in the optical axis N of the first optical system 31. The screen S is located at the upper side Y1 in the optical axis N of the first optical system 31. The lateral direction of the screen S corresponds to the X-axis direction. The intermediate image 33 is an image vertically flipped with respect to the projection image to be formed on the screen S. Further, the intermediate image 33 is an image distorted so that a rectangular final image is projected on the screen S as the magnification-side imaging surface. More specifically, the intermediate image 33 has a shape with which the keystone distortion of the final image to be formed on the screen S becomes small. In other words, the intermediate image 33 is distorted opposite with respect to the keystone distortion of the final image. Therefore, in the intermediate image 33, the side having the highest image height in the screen S is the shortest.

Further, in the following description, a virtual axis M extending in the Z-axis direction is set on the Y-Z plane. The virtual axis M is a design basis axis of the optical element 35. The virtual axis M is perpendicular to the screen S as the magnification-side imaging surface.

The first transmission surface 41 and the reflecting surface 42 are located on the lower side Y2 of the virtual axis M. The second transmission surface 43 is located at the upper side Y1 of the virtual axis M. The reflecting surface 42 is provided with a concavely curved surface shape when viewed from the first transmission surface 41 or the second transmission surface 43. Therefore, the reflecting surface 42 is provided with a concavely curved surface shape when viewed from the first transmission surface 41 or the second transmission surface 43. The reflecting surface 42 has positive power. The reflecting surface 42 is disposed by applying a reflection coat on the optical element 35 from the outside. The second transmission surface 43 is provided with a convexly curved surface shape protruding toward the magnification side. Therefore, the second transmission surface 43 has positive power. Here, the first transmission surface 41, the reflecting surface 42, and the second transmission surface 43 constitute a coaxial optical system having a plane rotationally symmetric with respect to the virtual axis M. Therefore, the virtual axis M is the design basis axis of the optical element 35. In the present example, the virtual axis M coincides with the optical axis N of the first optical system 31.

In the optical element 35, each of an upper half and a lower half is configured to be rotationally symmetric about the virtual axis M. In other words, the first transmission surface 41, the reflecting surface 42, and the second transmission surface 43 are provided with shapes obtained by rotating cross-sectional shapes in the Y-Z plane shown in FIG. 4 around the virtual axis M in an angular range of 90° toward each of one side and the other side in the X-axis direction. In the present example, the first transmission surface 41, the reflecting surface 42, and the second transmission surface 43 are each an aspherical surface.

In the optical element 35 of the second optical system 32, there can be defined an imaginary line P connecting an upper intersection point 53 and a lower intersection point 54 to each other, wherein an upper peripheral ray 51a of an upper end light beam 51 passing through an upper end in the Y-axis direction of an effective ray range 50 of the second transmission surface 43 and an upper peripheral ray 52a of a lower end light beam 52 passing through a lower end in the Y-axis direction of the effective ray range 50 cross each other at the upper intersection point 53 on the Y-Z plane, and a lower peripheral ray 51b of the upper end light beam 51 and a lower peripheral ray 52b of the lower end light beam 52 cross each other at the lower intersection point 54 on the Y-Z plane. The imaginary line P is tilted with respect to an imaginary vertical line V perpendicular to the virtual axis M in the Y-Z plane. Further, the tilt angle θ at which the imaginary line P is tilted with respect to the imaginary vertical line V is equal to or larger than 90°. The tilt angle θ is an angle measured clockwise on the drawing of FIG. 4 from the imaginary vertical line V. In other words, the tilt angle θ of the upper intersection point 53 side of the imaginary line P rotating clockwise pivoted on the intersection point between the imaginary vertical line V and the imaginary line P is equal to or larger than 90°. Here, the imaginary line P can also be called a pupil on the Y-Z plane. The ray having entered the optical element is converged on the imaginary line P or in the vicinity of the imaginary line P. The ray having entered the optical element becomes the smallest in flux diameter in an area A in the vicinity of the imaginary line P.

Here, as shown in FIG. 5, the optical element 35 is provided with a first member portion 65 and a second member portion 66 different in refractive index from the first member portion 65 on a light path of the ray having entered the optical element 35. The first member portion 65 is provided with a first first-member portion 65(1) provided with the first transmission surface 41 and the second transmission surface 43, and a second first-member portion 65(2) provided with the reflecting surface 42. The second member portion is located between the first first-member portion 65(1) and the second first-member portion 65(2) in the Z-axis direction. In the present example, the first member portion 65 is made of resin. The second member portion 66 is made of glass. As shown in FIG. 4, the flux diameter of the ray having entered the optical element 35 becomes the smallest in the second member portion 66. In other words, the area A where the flux diameter of the ray having entered the optical element 35 becomes the smallest is located inside the second member portion 66.

The second member portion 66 has a disk like shape as a whole. The second member portion 66 is provided with a circular flat surface on the first first-member portion 65(1) side, and a circular concavely curved surface at the second first-member portion 65(2) side. To the second member portion 66, the first first-member portion 65(1) adheres at one side in the Z-axis direction, and the second first-member portion 65(2) adheres at the other side in the Z-axis direction. Therefore, a bonding surface of the first first-member portion 65(1) and a bonding surface corresponding to the first first-member portion 65(1) of the second member portion 66 are provided with planar shapes corresponding to each other. A bonding surface corresponding to the second first-member portion 65(2) of the second member portion 66 is shaped like a concavely curved surface. A bonding surface corresponding to the second member portion 66 of the second first-member portion 65(2) has a convexly curved surface shape corresponding to the concavely curved surface shape of the second member portion 66.

The first member portion 65 and the second member portion 66 are different in refractive index from each other. Further, a bonding surface between the second member portion 66 and the second first-member portion 65(2) is shaped like a curved surface. Therefore, the optical element 35 is provided with power in the bonding surface between the second member portion 66 and the second first-member portion 65(2).

Further, the first member portion 65 and the second member portion 66 are different in material from each other, and are therefore different in heat resistance from each other. In other words, the second member portion 66 made of glass is higher in transmittance of a short-wavelength ray compared to the first member portion 65 made of resin. Thus, in the second member portion 66, rise in temperature caused by absorption of the short-wavelength ray is suppressed. Therefore, the second member portion 66 is difficult to generate heat and high in heat resistance compared to the first member portion 65.

Here, an aperture O2 is provided to the optical element 35 in some cases. The aperture O2 is disposed by dividing the optical element 35 along the imaginary line P, applying light-blocking ink to a divisional surface, and then integrally bonding the optical element 35 thus divided. It should be noted that the aperture O2 is only required to be formed using a member capable of blocking a part of the light beam, and is not limited to what is formed using the ink.

Lens Data

The lens data of the projection optical system 3A is as follows. The surface numbers are provided in sequence from the demagnification side toward the magnification side. The surfaces having the surface numbers attached with "*" are aspherical surfaces. The reference symbols represent the reference symbols of the respective lenses in the first optical system 31. In the second optical system 32, the reference symbols represent the reference symbols of the first transmission surface 41, the reflecting surface 42, and the second transmission surface 43, the first first-member portion 65(1), the second member portion 66, and the second first-member portion 65(2). Specifically, the surface number 32 corresponds to the first transmission surface 41. The surface number 33 corresponds to the bonding surface between the first first-member portion 65(1) and the second member portion 66. The surface number 34 corresponds to the bonding surface between the second member portion 66 and the second first-member portion 65(2). The surface number 35 corresponds to the reflecting surface 42. The surface number 36 corresponds to the bonding surface between the second first-member portion 65(2) and the second member portion 66. The surface number 37 corresponds to the bonding surface between the second member portion 66 and the first first-member portion 65(1). Therefore, the surface number 33 and the surface number 37 correspond to surfaces provided with the planar shape. Further, the surface number 34 and the surface number 36 correspond to surfaces provided with the curved surface shapes corresponding to each other. The surface number 38 corresponds to the second transmission surface 43. The reference symbol r represents a curvature radius, and the unit is millimeter. The reference symbol d represents an axial surface distance, and the unit is millimeter. The reference symbol nd represents a refractive index. The reference symbol νd represents an Abbe number. The reference symbol E represents an effective diameter.

| SURFACE NUMBER | REFERENCE SYMBOL | r | d | nd.vd | E |
|---|---|---|---|---|---|
| 1 | 18 | 1.000000E+18 | 7.125000E+00 | | |
| 2 | 19 | 1.000000E+18 | 1.943250E+01 | SBSL7_OHARA | 10.2460 |
| 3 | | 1.000000E+18 | 1.047590E+00 | | 12.9995 |
| 4 | L1 | −8.137605E+01 | 2.980393E+00 | 833452.4284 | 13.0000 |
| 5 | | −3.036383E+01 | 1.500000E−01 | | 13.2128 |
| 6 | L2 | 1.394908E+02 | 6.481168E+00 | 442762.8800 | 13.2020 |
| 7 | L3 | −2.029233E+01 | 9.000000E−01 | 841025.3008 | 13.1708 |
| 8 | | −5.174502E+01 | 1.500000E−01 | | 13.7699 |
| 9 | L4 | 5.204754E+01 | 7.750728E+00 | SBSL7_OHARA | 13.9780 |
| 10 | L5 | −2.396396E+01 | 9.000000E−01 | TAFD25_HOYA | 13.8938 |
| 11 | | −1.951632E+02 | 1.952854E−18 | | 14.3575 |
| 12 | L6 | 8.966737E+01 | 5.760730E+00 | 443662.8700 | 14.5587 |
| 13 | | −3.585670E+01 | 3.320933E+01 | | 14.6014 |
| 14 | APERTURE | 1.000000E+18 | 8.911744E+00 | | 9.0000 |
| 15 | L7 | 1.491215E+01 | 1.863485E+00 | 442394.8842 | 10.2070 |
| 16 | | 1.554369E+01 | 5.927868E+00 | | 9.9239 |
| 17 | L8 | 2.358114E+01 | 3.721603E+00 | 845248.2382 | 10.2052 |
| 18 | | −2.247351E+05 | 1.886609E+00 | | 9.9477 |
| 19 | L9 | 2.631042E+01 | 1.400000E+00 | 774921.4475 | 8.7435 |
| 20 | | 1.569598E+01 | 2.193697E+00 | | 8.0003 |

-continued

| SURFACE NUMBER | REFERENCE SYMBOL | r | d | nd.vd | E |
|---|---|---|---|---|---|
| 21 | dummy | 1.000000E+18 | 1.839933E+00 | | 8.0000 |
| 22 | L10 | −1.833034E+01 | 1.400000E+00 | 760279.5148 | 8.0000 |
| 23 | | −5.181562E+01 | 3.267284E−01 | | 8.5311 |
| 24 | L11 | 5.424583E+01 | 8.360620E+00 | 595747.5995 | 8.9638 |
| 25 | L12 | −1.240084E+01 | 5.328301E+00 | 846663.2378 | 9.2522 |
| 26 | | −4.504425E+01 | 3.210295E+01 | | 10.9579 |
| 27 | L13 | 2.620554E+01 | 7.272318E+00 | 496363.7718 | 19.1856 |
| 28 | L14 | 1.796072E+01 | 1.590168E+01 | 437001.9510 | 16.8482 |
| 29 | | −5.148033E+01 | 2.699047E+00 | | 16.6404 |
| 30 | L15 | −4.316612E+01 | 1.193510E+01 | 834805.4272 | 15.5891 |
| 31 | | 3.892243E+01 | 1.205746E+00 | | 15.5197 |
| 32* | 41 | −4.030750E+01 | 1.029203E+01 | E48R_ZEON | 16.1644 |
| 33 | 66 | 1.000000E+18 | 8.000000E+00 | 521429.4812 | 15.7451 |
| 34 | 65 (2) | 7.011600E+01 | 7.841899E+00 | E48R_ZEON | 15.6771 |
| 35* | 42 | −1.911158E+01 | −7.841899E+00 | E48R_ZEON | 15.6969 |
| 36 | 66 | 7.011600E+01 | −8.000000E+00 | 521429.4812 | 14.8254 |
| 37 | 65 (1) | 1.000000E+18 | −1.029203E+01 | E48R_ZEON | 15.6012 |
| 38* | 43 | 1.640154E+01 | −2.900000E+02 | | 15.6196 |
| 39 | S | 1.000000E+18 | | | 869.4205 |

| SURFACE NUMBER | 32 | 35 | 38 |
|---|---|---|---|
| Y CURVATURE RADIUS | −40.30750223 | −19.11158279 | 16.40153715 |
| CONIC CONSTANT (K) | 0 | −1 | 0 |
| 4th-ORDER COEFFICIENT (A) | 0.000176404 | 1.6998E−05 | −9.4286E−06 |
| 6th-ORDER COEFFICIENT (B) | −4.61287E−07 | −8.87216E−08 | −1.08371E−07 |
| 8th-ORDER COEFFICIENT (C) | 7.78143E−10 | 5.95604E−10 | 5.26923E−10 |
| 10th-ORDER COEFFICIENT (D) | −5.87356E−13 | −2.65675E−12 | −9.76373E−13 |
| 12th-ORDER COEFFICIENT (E) | 0 | 7.21982E−15 | 0 |
| 14th-ORDER COEFFICIENT (F) | 0 | −8.45468E−18 | 0 |
| 16th-ORDER COEFFICIENT (G) | 0 | 0 | 0 |
| 18th-ORDER COEFFICIENT (H) | 0 | 0 | 0 |
| 20th-ORDER COEFFICIENT (J) | 0 | 0 | 0 |

Advantages

In the projection optical system 3A of the present example, the optical element 35 constituting the second optical system 32 is provided with the reflecting surface 42 shaped like a concavely curved surface, and the second transmission surface 43 shaped like a convexly curved surface protruding toward the magnification side. Therefore, the optical element 35 is capable of refracting the light beam reflected by the reflecting surface 42 with the second transmission surface 43. Therefore, it is easy to shorten the focal length of the projection optical system 3A, namely to shorten the projection distance, compared to when the second optical system 32 is only provided with the reflecting surface 42. Further, since the optical element 35 is provided with the second transmission surface 43 shaped like a convexly curved surface protruding toward the magnification side, it is possible to prevent the reflecting surface 42 shaped like the concavely curved surface disposed at the magnification side of the intermediate image 33 from growing in size even when shortening the projection distance.

Figure 6:
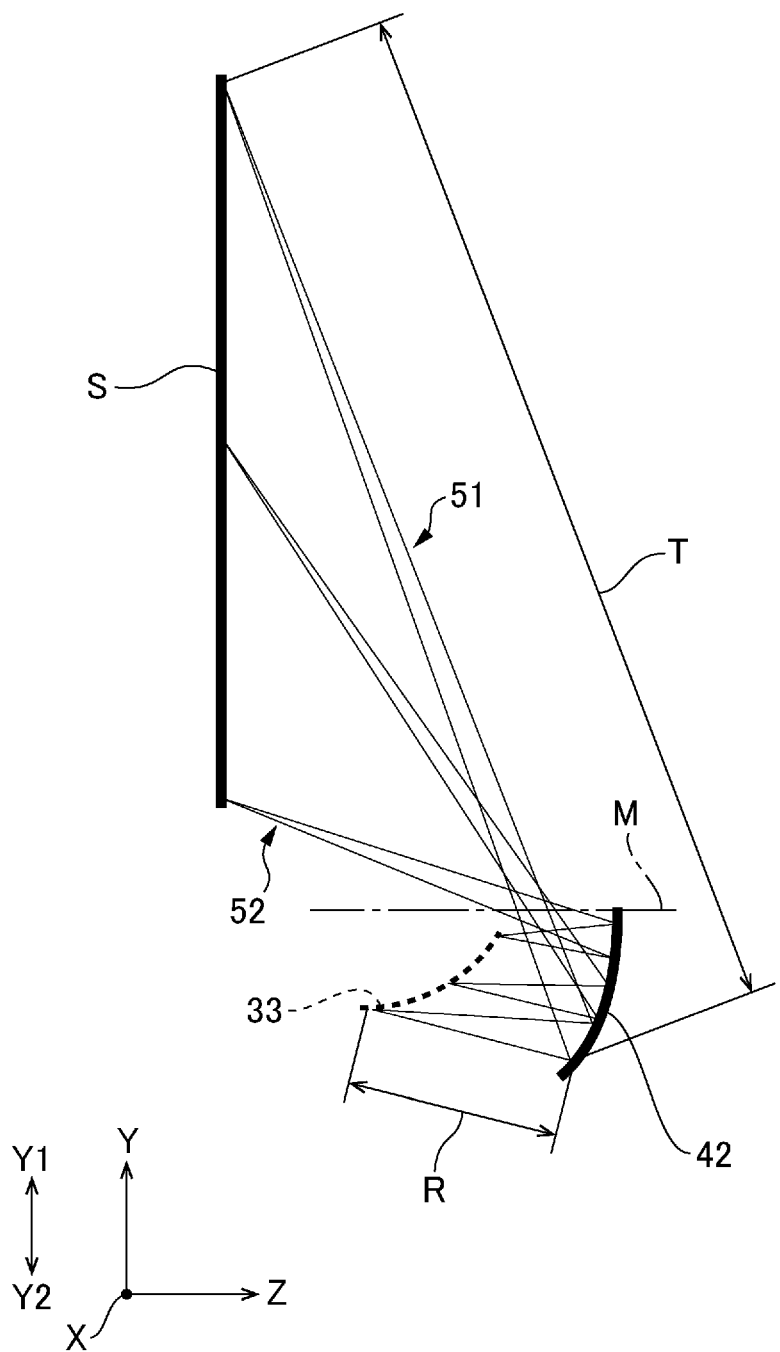
FIG. 6 is an explanatory diagram of the magnifying power when providing only a reflecting surface on a magnification side of an intermediate image.
Figure 7:
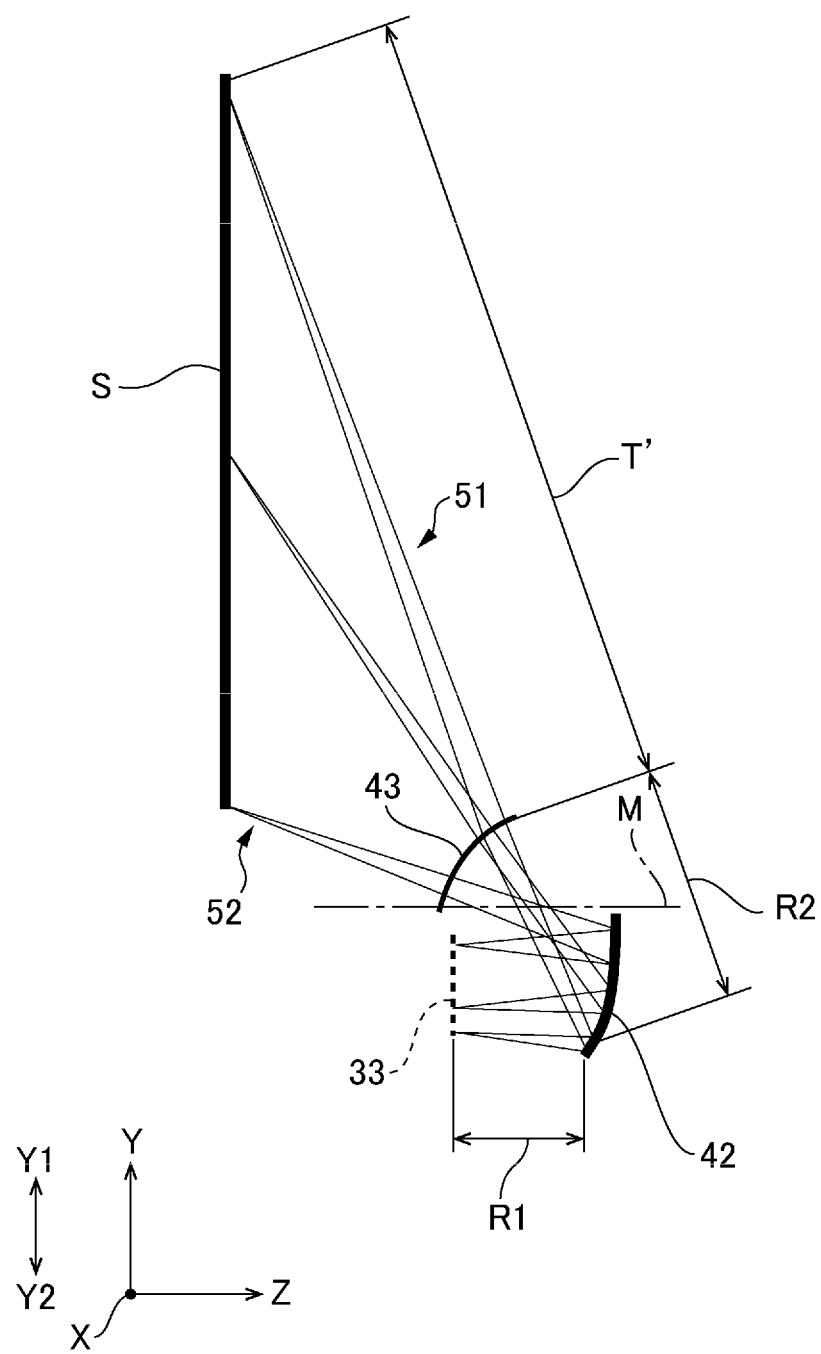
FIG. 7 is an explanatory diagram of the magnifying power when providing the reflecting surface and a second transmission surface at the magnification side of the intermediate image.

Such an advantage will be described with reference to FIG. 6 and FIG. 7. FIG. 6 is an explanatory diagram of the magnifying power when the second optical system 32 is provided only with the reflecting surface 42 at the magnification side of the intermediate image 33. FIG. 7 is an explanatory diagram of the magnifying power when the second optical system 32 is provided with the reflecting surface 42 and the second transmission surface 43 shaped like the convexly curved surface at the magnification side of the intermediate image 33.

When the second optical system 32 is provided only with the reflecting surface 42 at the magnification side of the intermediate image 33 as shown in FIG. 6, the magnifying power Q of the projection optical system 3A is a ratio of a distance T from the reflecting surface 42 to the screen S with respect to a distance R between the intermediate image 33 and the reflecting surface 42 in the light path of a specific ray from the intermediate image 33 to the screen S. In other words, Q=T/R is fulfilled. Therefore, the intermediate image 33 conjugated with the screen S as the magnification-side imaging surface is significantly tilted in a direction along the virtual axis M in order to match the magnifying power Q, and thus, the field curvature is made to be generated. Here, the intermediate image 33 enlarges when being tilted. Further, when the intermediate image 33 enlarges, there arises the necessity of enlarging the reflecting surface 42 located at the magnification side of the intermediate image 33. Therefore, in the projection optical system 3A provided only with the reflecting surface 42 shaped like a concavely curved surface at the magnification side of the intermediate image 33, the reflecting surface 42 is apt to grow in size when shortening the projection distance. Further, when the intermediate image 33 grows in size, the distance between the first optical system 31 and the second optical system 32 is required, and the total length of the projection optical system 3A elongates.

In contrast, in the present example, since the second optical system 32 is provided with the second transmission surface 43 shaped like a convexly curved surface at the magnification side of the reflecting surface 42, it is possible to prevent the intermediate image 33 from growing in size. In other words, as shown in FIG. 7, in the present example, the magnifying power Q of the projection optical system 3A is a ratio of a distance T' between the second transmission surface 43 and the screen S with respect to the sum of a distance R1 between the intermediate image 33 and the reflecting surface 42 and a distance R2 between the reflecting surface 42 and the second transmission surface 43 in the light path of a specific ray from the intermediate image 33 to the screen S. In other words, $Q=T'/(R1+R2)$ is fulfilled. Thus, the intermediate image 33 conjugated with the screen S as the magnification-side imaging surface is not significantly tilted along the virtual axis M in order to match the magnifying power, and the field curvature is made to decrease. Therefore, it is possible to prevent the intermediate image 33 from growing in size. Therefore, it is possible to prevent the reflecting surface 42 located at the magnification side of the intermediate image 33 from growing in size. Further, when the ray 51 on the outermost circumference can be refracted inward when passing through the first transmission surface 41, it becomes possible to further reduce the size of the reflecting surface 42. Further, since the second transmission surface 43 is shaped like a convexly curved surface, and has positive power, the action of converging the light beam works to make it possible to prevent the reflecting surface 42 from growing in size compared to when the second transmission surface 43 is not disposed.

Further, in the present example, the intermediate image 33 is located between the first transmission surface 41 and the reflecting surface 42 in the optical element 35. Therefore, it is possible to make the first optical system 31 and the optical element 35 close to each other compared to when the intermediate image 33 is formed between the first optical system 31 and the optical element 35. Thus, the projection optical system 3A can be made compact.

Further, in the present example, the first transmission surface 41, the reflecting surface 42, and the second transmission surface 43 of the second optical system are each an aspherical surface. Therefore, in the projection optical system 3A according to the present example, it is possible to prevent generation of aberration.

Further, in the present example, since the first transmission surface 41 located on the demagnification side of the intermediate image 33 is the aspherical surface, it is possible to prevent the aberration from generating in the intermediate image 33. Further, in the present example, the intermediate image 33 is not significantly tilted along the virtual axis M, but the intermediate image 33 is standing in a direction perpendicular to the virtual axis M. Therefore, it is easy to make the first transmission surface 41 and the intermediate image 33 close to each other in the Z-axis direction, and it is possible to dispose the aspherical surface at a position close to the intermediate image 33. Therefore, it is possible to efficiently correct the aberration generated in the intermediate image 33.

Further, in the present example, since the imaginary line P is tilted with respect to the imaginary vertical line V, it is possible to make the lower end light beam 52 passing through the lower end of the effective ray range 50 of the second transmission surface 43 reach the screen S without being blocked.

Figure 8:
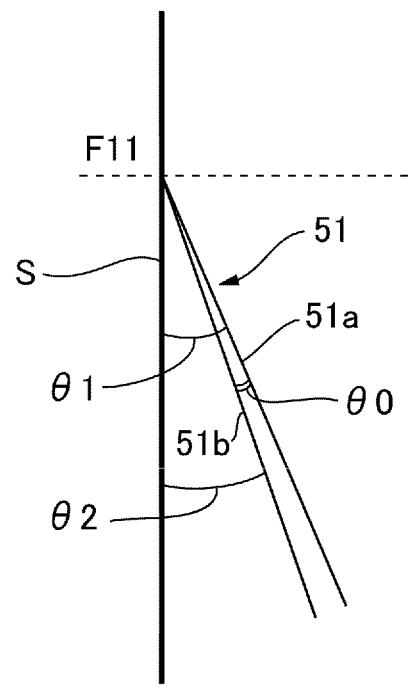
FIG. 8 is an explanatory diagram of a divergence angle of a light beam reaching an upper part of a screen.

Further, in the present example, since the imaginary line P is tilted with respect to the imaginary vertical line V, it is possible to prevent an amount of the light in the upper peripheral part of the screen S from decreasing compared to when the imaginary line P is parallel to the imaginary vertical line V. In other words, when the imaginary line P is tilted with respect to the imaginary vertical line V, the divergence angle θ0 of the light beam reaching the upper part of the screen S becomes large compared to when the imaginary line P is parallel to the imaginary vertical line V. Thus, an amount of the light reaching the upper part of the screen S increases. Here, FIG. 8 is an explanatory diagram of the divergence angle of the light beam reaching the screen S. FIG. 8 is a partial enlarged view of the part A shown in FIG. 2. The divergence angle θ0 of the light beam reaching the upper part of the screen S corresponds to a difference between an angle θ1 formed by the screen S and the upper peripheral ray 51a of the upper end light beam 51 and an angle θ2 formed by the screen S and the lower peripheral ray 51b of the upper end light beam 51.

Figure 9:
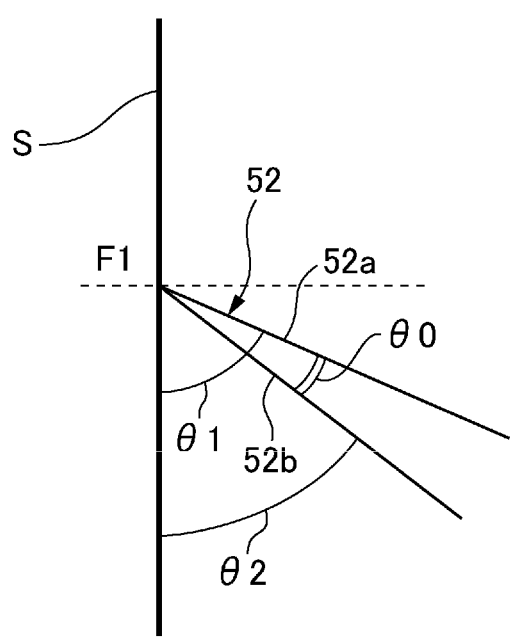
FIG. 9 is an explanatory diagram of a divergence angle of a light beam reaching a lower part of the screen.

Further, when the divergence angle θ0 of the light beam reaching the upper part of the screen S becomes large, the difference from the divergence angle θ0 of a light beam reaching a lower part of the screen S becomes small. Therefore, it is possible to prevent the amount of light in the upper peripheral part of the screen S from decreasing compared to that in the lower part. Here, FIG. 9 is an explanatory diagram of the divergence angle of the light beam reaching the screen S. FIG. 9 is a partial enlarged view of the part B shown in FIG. 2. The divergence angle θ0 of the light beam reaching the lower part of the screen S corresponds to a difference between an angle θ1 formed by the screen S and the upper peripheral ray 52a of the lower end light beam 52 and an angle θ2 formed by the screen S and the lower peripheral ray 52b of the lower end light beam 52.

Further, in the present example, the tilt angle θ at which the imaginary line P is tilted with respect to the imaginary vertical line V is equal to or larger than 90°. Thus, the divergence angle θ0 of the light beam reaching the lower part of the screen S becomes small. Therefore, since the difference between the divergence angle θ0 of the light beam reaching the upper part of the screen S and the divergence angle θ0 of the ray reaching the lower part of the screen S becomes small, it is possible to suppress the difference in amount of light between the upper part and the lower part generated in the screen S.

Then, in the present example, the ray passing through the optical element 35 is converged inside the optical element 35 by the reflecting surface 42 shaped like a concavely curved surface. Therefore, the light density rises inside the optical element 35, and a part of the optical element 35 becomes high in temperature. In this case, there arises a problem that the part of the optical element 35 having become high in temperature thermally expands to incur deterioration in optical performance of the projection optical system 3A.

To cope with such a problem, the optical element 35 is provided with the first member portion 65 made of resin and the second member portion 66 made of glass on the light path of the ray passing through the optical element 35. Further, the area A where the flux diameter of the ray having entered the optical element 35 becomes the smallest is made to be located in the second member portion 66. Thus, the area A in which the light density becomes high inside the optical element 35, and which is apt to become high in temperature is formed of a material high in heat resistance. Therefore, it is possible to prevent or avoid a part of the optical element 35 having become high in temperature from thermally expanding to incur deterioration in optical performance of the projection optical system 3A.

Further, the second member portion 66 made of glass is provided with a flat surface as one of the surfaces in the Z-axis direction. Further, the other of the surfaces of the second member portion 66 made of glass is shape like a concavely curved surface, but is not an aspherical surface. Therefore, it is easy to manufacture the second member portion 66. On the other hand, in the optical element 35, the first first-member portion 65(1) provided with the first transmission surface 41 as an aspherical surface and the second transmission surface 43 as an aspherical surface, and the second first-member portion 65(2) provided with the reflecting surface 42 as an aspherical surface are both made of resin. Therefore, it is easy to provide the aspherical surfaces to the optical element 35 compared to when the first first-member portion 65(1) and the second first-member portion 65(2) are made of glass.

Further, since the intermediate image 33 is formed in the second member portion 66, there is no chance for the intermediate image 33 to traverse the bonding surface between the first member portion 65 and the second member portion 66. Therefore, it is possible to prevent the projection image from deteriorating due to the bonding surface between the first member portion 65 and the second member portion 66.

Further, in the present example, the first member portion 65 and the second member portion 66 are different in refractive index from each other. Further, the bonding surface between the second member portion 66 and the second first-member portion 65(2) is shaped like a curved surface. Therefore, the optical element 35 has the positive power in the bonding surface between the second member portion 66 and the second first-member portion 65(2). Therefore, it is possible for the optical element 35 to control a variety of types of aberration in the bonding surface between the second member portion 66 and the second first-member portion 65(2) to improve the resolution.

As described above, according to the projection optical system 3A of the present example, it is possible to perform correction of the variety of types of aberration in the second optical system 32 even when the second optical system 32 is formed of a single optical element 35. Therefore, the degree of design freedom of the first optical system 31 can be ensured.

Figure 10:
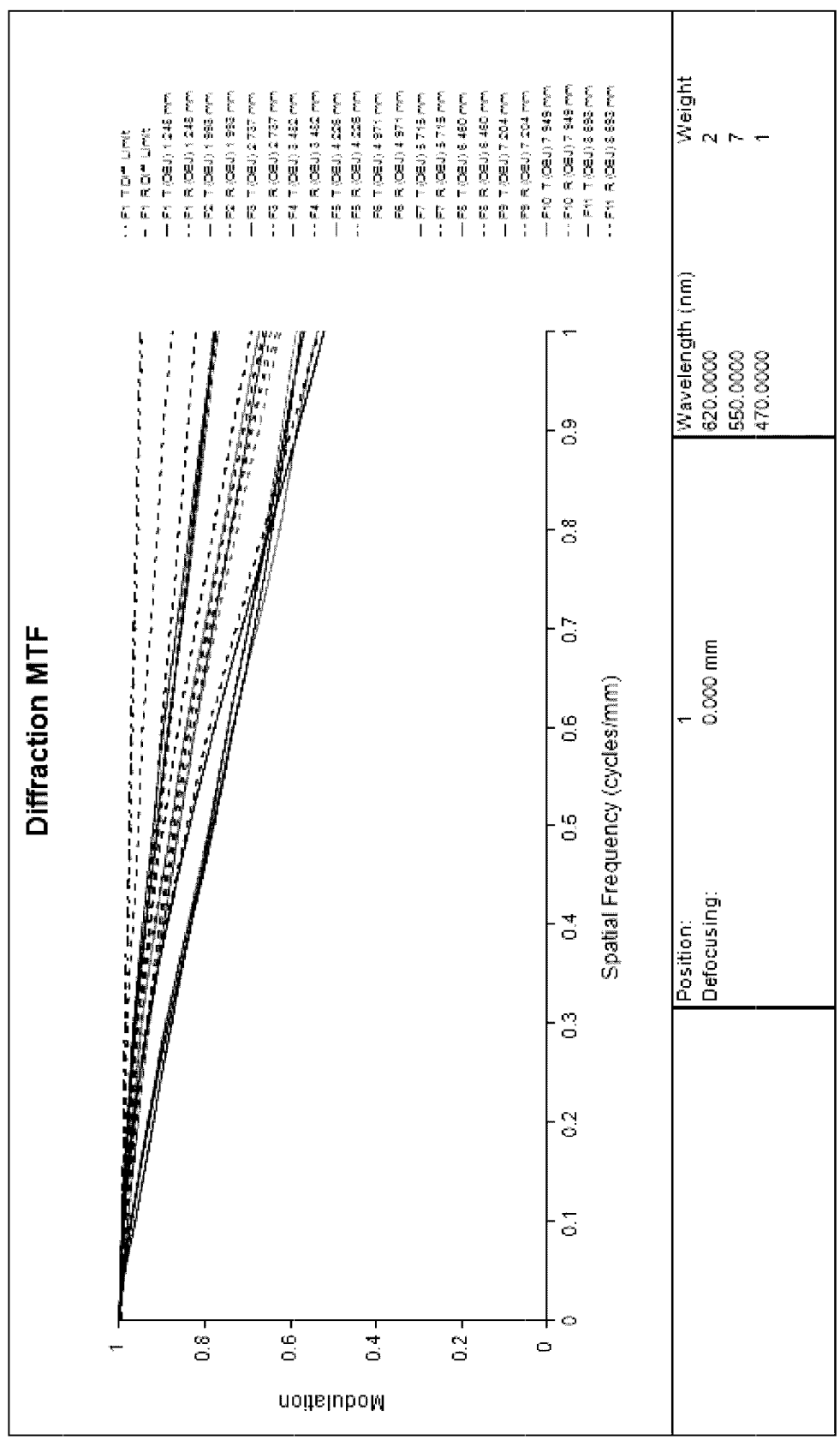
FIG. 10 is a diagram showing MTF at the magnification side of the projection optical system in the practical example.

FIG. 10 is a diagram showing MTF on the magnification side of the projection optical system 3A. The horizontal axis in FIG. 10 showing the MTF represents a spatial frequency. The vertical axis represents a contrast reproduction ratio. As shown in FIG. 10, the projection optical system 3A according to the present example has high resolution.

Comparative Example

Figure 11:
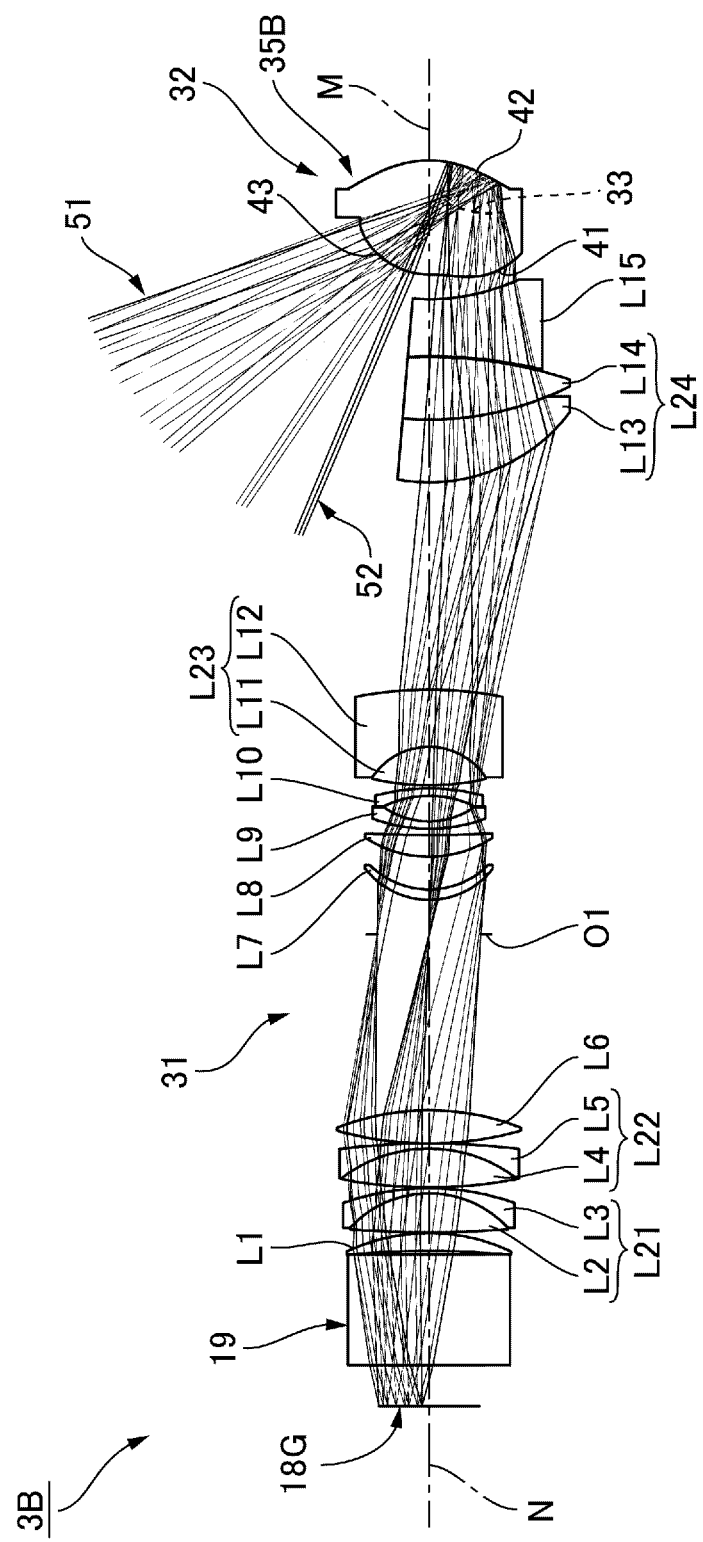
FIG. 11 is a ray chart of a projection optical system in a comparative example.
Figure 12:
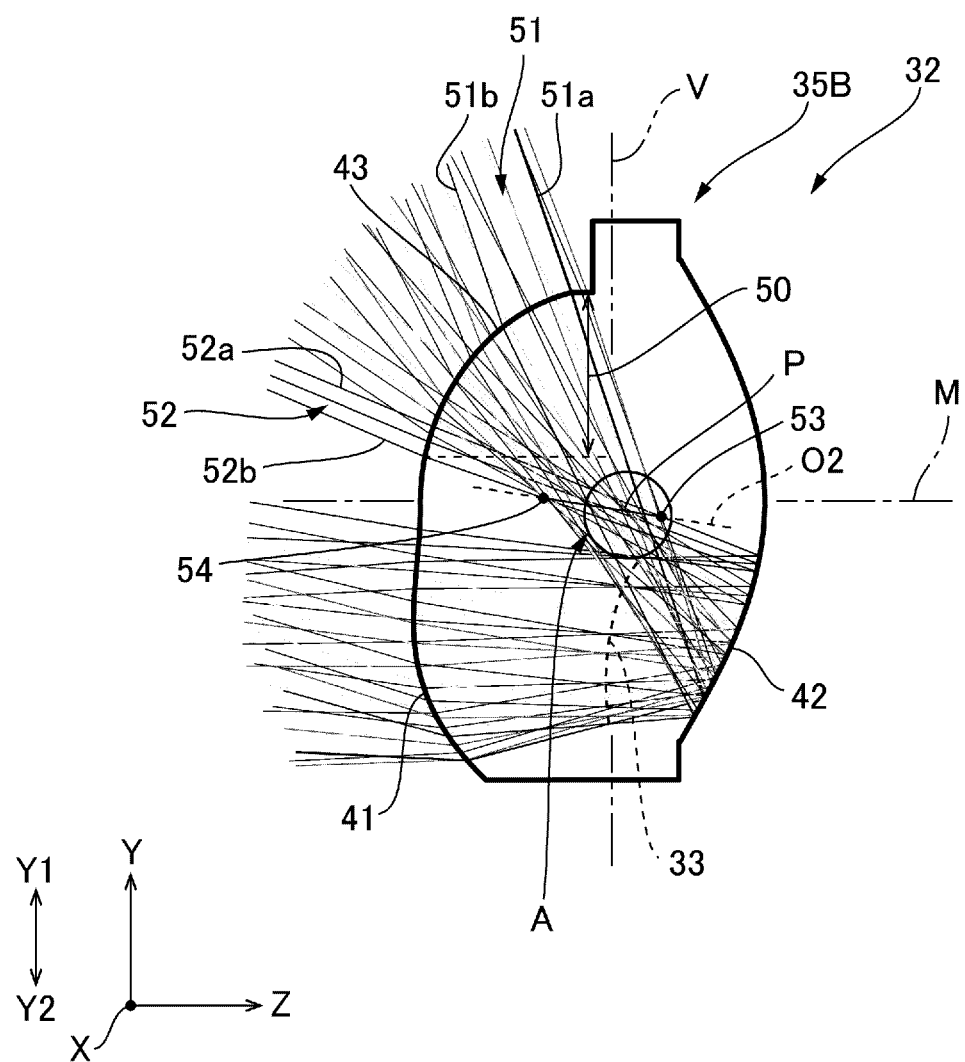
FIG. 12 is a ray chart of a second optical system in the comparative example.
Figure 13:
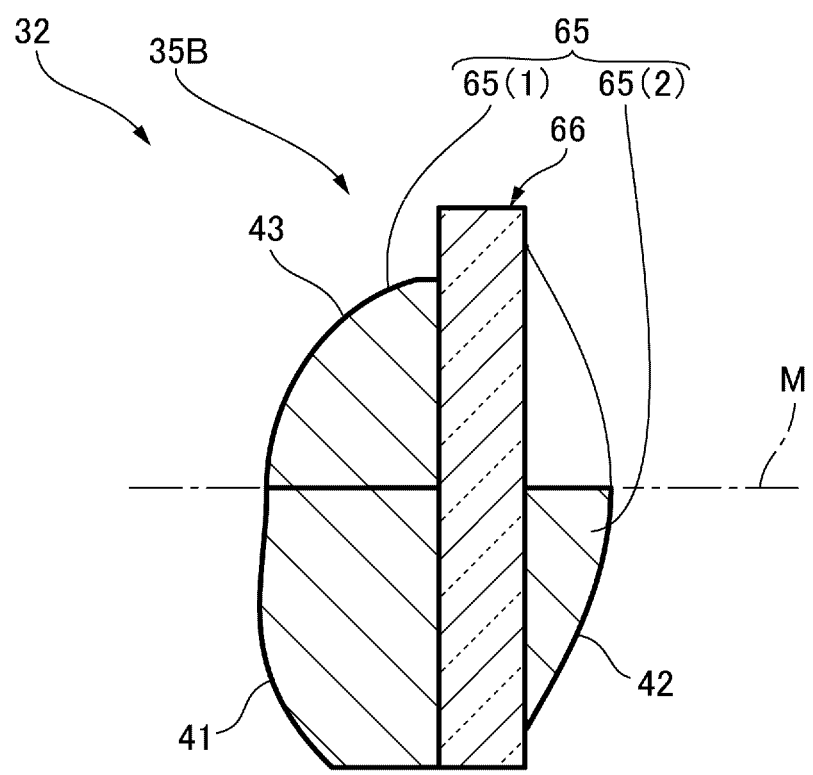
FIG. 13 is an explanatory diagram of a material of an optical element constituting the second optical system in the comparative example.

Here, the advantage that the projection optical system 3A according to the practical example has the high resolution will be described in comparison with the advantage of the projection optical system in the comparative example. FIG. 11 is a ray chart of the projection optical system in the comparative example. FIG. 12 is a ray chart of a second optical system in the comparative example. FIG. 13 is an explanatory diagram of a material of an optical element constituting the second optical system in the comparative example. The projection optical system 3B according to the present example is constituted by the first optical system 31 and the second optical system 32 disposed in sequence from the demagnification side toward the magnification side similarly to the projection optical system 3A. In other words, the projection optical system 3B is provided with substantially the same configuration as that of the projection optical system 3A shown in FIG. 2. Further, as shown in FIG. 11 and FIG. 12, the projection optical system 3B forms the intermediate image 33 between the demagnification-side imaging surface and the magnification-side imaging surface. The intermediate image 33 is formed inside the second optical system 32.

The first optical system 31 is a refracting optical system provided with a plurality of lenses. In the present example, the first optical system 31 is provided with fifteen lenses. The second optical system 32 is formed of a single optical element 35B. The intermediate image 33 is formed inside the optical element 35B.

In the demagnification-side imaging surface, there are disposed the liquid crystal panel 18R, the liquid crystal panel 18G, and the liquid crystal panel 18B of the image formation section 2. In FIG. 11, there is shown the liquid crystal panel 18G as one of the three liquid crystal panels 18R, 18G, and 18B. The liquid crystal panel 18R, the liquid crystal panel 18G, and the liquid crystal panel 18B each form the projection image at one side in the optical axis N of the first optical system 31 in the demagnification-side imaging surface. On the magnification-side imaging surface, there is disposed the screen S.

As shown in FIG. 11, the first optical system 31 has the cross dichroic prism 19, and the fifteen lenses L1 through L15. The first lens L1 through the fifteenth lens L15 are arranged in this order from the demagnification side toward the magnification side. In the present example, the second lens L2 and the third lens L3 are bonded to each other to form the first cemented lens L21. The fourth lens L4 and the fifth lens L5 are bonded to each other to form the second cemented lens L22. The eleventh lens L11 and the twelfth lens L12 are bonded to each other to form the third cemented lens L23. The thirteenth lens L13 and the fourteenth lens L14 are bonded to each other to form the fourth cemented lens L24. The aperture O1 is disposed between the seventh lens L7 and the eighth lens L8. It should be noted that the first optical system 31 is not provided with the cross dichroic prism 19 in some cases.

As shown in FIG. 12, the optical element 35B has the first transmission surface 41, the reflecting surface 42, and the second transmission surface 43 in sequence from the demagnification side toward the magnification side. As shown in FIG. 2, the optical axis N of the first optical system 31 extends in the Z-axis direction. The image formation section 2 forms the projection image at the upper side Y1 in the optical axis N of the first optical system 31. The intermediate image 33 is formed at the lower side Y2 in the optical axis N of the first optical system 31. The screen S is located at the upper side Y1 in the optical axis N of the first optical system 31. The lateral direction of the screen S corresponds to the X-axis direction.

The intermediate image 33 is an image vertically flipped with respect to the projection image to be formed on the screen S. Further, the intermediate image 33 is an image distorted so that a rectangular final image is projected on the screen S as the magnification-side imaging surface. More specifically, the intermediate image 33 has a shape with which the keystone distortion of the final image to be formed on the screen S becomes small. In other words, the intermediate image is distorted opposite with respect to the keystone distortion of the final image. Therefore, in the intermediate image 33, the side having the highest image height in the screen S is the shortest.

Also in the present example, a virtual axis M extending in the Z-axis direction is set on the Y-Z plane. The virtual axis M is a design basis axis of the optical element 35B. The virtual axis M is perpendicular to the screen S as the magnification-side imaging surface.

The first transmission surface 41 and the reflecting surface 42 are located on the lower side Y2 of the virtual axis M. The second transmission surface 43 is located at the upper side Y1 of the virtual axis M. The reflecting surface 42 is provided with a concavely curved surface shape recessed in a direction of getting away from the first transmission surface 41. Therefore, the reflecting surface 42 has positive power. The reflecting surface 42 is disposed by applying a reflection coat on the optical element 35B from the outside. The second transmission surface 43 is provided with a convexly curved surface shape protruding toward the magnification side. Therefore, the second transmission surface 43 has positive power. Here, the first transmission surface 41, the reflecting surface 42, and the second transmission surface 43 constitute a coaxial optical system having a plane rotationally symmetric with respect to the virtual axis M. Therefore, the virtual axis M is the design basis axis of the optical element 35B, and at the same time, the optical axis of the optical element 35B. In the present example, the virtual axis M coincides with the optical axis N of the first optical system 31.

In the optical element 35B, each of an upper half and a lower half is configured to be rotationally symmetric about the virtual axis M. In other words, the first transmission surface 41, the reflecting surface 42, and the second transmission surface 43 are provided with shapes obtained by rotating cross-sectional shapes in the Y-Z plane shown in FIG. 11 around the virtual axis M in an angular range of 90° toward each of one side and the other side in the X-axis direction. In the present example, the first transmission surface 41, the reflecting surface 42, and the second transmission surface 43 are each an aspherical surface.

In the optical element 35B of the second optical system 32, there can be defined an imaginary line P connecting the upper intersection point 53 and the lower intersection point 54 to each other, wherein the upper peripheral ray 51a of the upper end light beam 51 passing through the upper end in the Y-axis direction of the effective ray range 50 of the second transmission surface 43 and the upper peripheral ray 52a of the lower end light beam 52 passing through the lower end in the Y-axis direction of the effective ray range 50 cross each other at the upper intersection point 53 on the Y-Z plane, and the lower peripheral ray 51b of the upper end light beam 51 and the lower peripheral ray 52b of the lower end light beam 52 cross each other at the lower intersection point 54 on the Y-Z plane. The imaginary line P is tilted with respect to the imaginary vertical line V perpendicular to the virtual axis M on the Y-Z plane. Further, the tilt angle θ at which the imaginary line P is tilted with respect to the imaginary vertical line V is equal to or larger than 90°. In other words, the tilt angle θ of the upper intersection point 53 side of the imaginary line P rotating clockwise pivoted on the intersection point between the imaginary vertical line V and the imaginary line P is equal to or larger than 90°. Here, the imaginary line P can also be called the pupil on the Y-Z plane. The ray having entered the optical element is converged on the imaginary line P or in the vicinity of the imaginary line P. The ray having entered the optical element becomes the smallest in flux diameter in an area A in the vicinity of the imaginary line P.

Here, as shown in FIG. 13, the optical element 35B is provided with the first member portion 65 and the second member portion 66 different in refractive index from the first member portion 65 on the light path of the ray having entered the optical element 35B. The first member portion 65 is provided with a first first-member portion 65(1) provided with the first transmission surface 41 and the second transmission surface 43, and a second first-member portion 65(2) provided with the reflecting surface 42. The second member portion is located between the first first-member portion 65(1) and the second first-member portion 65(2) in the Z-axis direction. In the present example, the first member portion 65 is made of resin. The second member portion 66 is made of glass. As shown in FIG. 12, the flux diameter of the ray having entered the optical element 35B becomes the smallest in the second member portion 66. In other words, the area A where the flux diameter of the ray having entered the optical element 35B becomes the smallest is located inside the second member portion 66.

The second member portion 66 has a disk like shape as a whole. The second member portion 66 is provided with flat surfaces as both of the surfaces in the Z-axis direction. Specifically, the second member portion 66 is provided with circular flat surfaces on the first first-member portion 65(1) side, and at the second first-member portion 65(2) side. To the second member portion 66, the first first-member portion 65(1) adheres at one side in the Z-axis direction, and the second first-member portion 65(2) adheres at the other side in the Z-axis direction. Therefore, the bonding surface of the first first-member portion 65(1) and the bonding surface corresponding to the first first-member portion 65(1) of the second member portion 66 are provided with the planar shapes. Further, the bonding surface corresponding to the second first-member portion 65(2) of the second member portion 66 and the bonding surface corresponding to the second member portion 66 of the second first-member portion 65(2) are provided with the planar shapes. Therefore, the optical element 35B is not provided with power in the bonding surface between the second member portion 66 and the first first-member portion 65(1). Further, the optical element 35B is not provided with power in the bonding surface between the second member portion 66 and the second first-member portion 65(2).

Lens Data

The lens data of the projection optical system 3B is as follows. The surface numbers are provided in sequence from the demagnification side toward the magnification side. The surfaces having the surface numbers attached with "*" are aspherical surfaces. The surface number 1 corresponds to the liquid crystal panel 18, and is the demagnification-side imaging surface. The surface number 2 corresponds to a surface at the demagnification side of the cross dichroic prism 19, and the surface number 3 corresponds to a surface at the magnification side. The field of the surface number 21 corresponds to dummy data. The reference symbols represent the reference symbols of the respective lenses in the first optical system 31.

Further, the reference symbols represent the reference symbols of the respective lenses in the first optical system 31. In the second optical system 32, the reference symbols represent the reference symbols of the first transmission surface 41, the reflecting surface 42, and the second transmission surface 43, the first first-member portion 65(1), the second member portion 66, and the second first-member portion 65(2). Specifically, the surface number 32 corresponds to the first transmission surface 41. The surface number 33 corresponds to the bonding surface between the first first-member portion 65(1) and the second member portion 66. The surface number 34 corresponds to the bonding surface between the second member portion 66 and the second first-member portion 65(2). The surface number 35 corresponds to the reflecting surface 42. The surface number 36 corresponds to the bonding surface between the second first-member portion 65(2) and the second member portion 66. The surface number 37 corresponds to the bonding surface between the second member portion 66 and the first first-member portion 65(1). Therefore, the surface number 33, the surface number 34, the surface number 36, and the surface number 37 correspond to surfaces each provided with the planar shape. The surface number 38 corresponds to the second transmission surface 43. The reference symbol r represents a curvature radius, and the unit is millimeter. The reference symbol d represents an axial surface distance, and the unit is millimeter. The reference symbol nd represents a refractive index. The reference symbol νd represents an Abbe number. The reference symbol E represents an effective diameter.

| SURFACE NUMBER | REFERENCE SYMBOL | r | d | nd.vd | E |
|---|---|---|---|---|---|
| 1 | 18 | 1.000000E+18 | 7.125000E+00 | | |
| 2 | 19 | 1.000000E+18 | 1.943250E+01 | SBSL7_OHARA | 10.2460 |
| 3 | | 1.000000E+18 | 6.122123E−01 | | 12.9994 |
| 4 | L1 | −1.389956E+02 | 3.125229E+00 | 814032.2838 | 13.0000 |
| 5 | | −3.305925E+01 | 1.500000E−01 | | 13.1616 |
| 6 | L2 | 1.868799E+02 | 6.811206E+00 | 440669.9044 | 13.0781 |
| 7 | L3 | −1.856159E+01 | 9.000000E−01 | 846631.2381 | 13.0432 |
| 8 | | −4.418858E+01 | 1.500000E−01 | | 13.7738 |
| 9 | L4 | 8.133758E+01 | 6.797193E+00 | SBSL7_OHARA | 13.9799 |
| 10 | L5 | −2.483403E+01 | 9.000000E−01 | TAFD25_HOYA | 13.9518 |
| 11 | | −1.246978E+02 | −2.186868E−18 | | 14.4662 |
| 12 | L6 | 5.811725E+01 | 5.807587E+00 | 450186.8998 | 14.7963 |
| 13 | | −4.346780E+01 | 3.090529E+01 | | 14.7947 |
| 14 | APERTURE | 1.000000E+18 | 6.000000E+00 | | 9.0000 |
| 15 | L7 | 1.397540E+01 | 1.819399E+00 | 439307.9210 | 10.1136 |
| 16 | | 1.454779E+01 | 5.748176E+00 | | 9.8154 |
| 17 | L8 | 2.013485E+01 | 3.798571E+00 | 846663.2378 | 10.0580 |
| 18 | | 2.088220E+02 | 1.092626E+00 | | 9.7652 |
| 19 | L9 | 2.775553E+01 | 1.300000E+00 | 605966.6170 | 8.8797 |
| 20 | | 1.373656E+01 | 2.572574E+00 | | 8.0004 |
| 21 | dummy | 1.000000E+18 | 1.897183E+00 | | 8.0000 |
| 22 | L10 | −1.783750E+01 | 1.300000E+00 | 834497.4275 | 8.0000 |
| 23 | | −3.554577E+01 | 5.570724E−01 | | 8.4858 |
| 24 | L11 | 4.396420E+01 | 6.728590E+00 | 578240.6451 | 9.0046 |
| 25 | L12 | −1.173764E+01 | 1.003692E+01 | 844962.2531 | 9.0774 |
| 26 | | −6.391509E+01 | 3.633947E+01 | | 11.7469 |
| 27 | L13 | 3.048211E+01 | 1.098635E+01 | 808760.4525 | 23.0000 |
| 28 | L14 | 5.418506E+01 | 1.098030E+01 | 554704.6736 | 20.2039 |
| 29 | | −7.764110E+01 | 1.508594E−01 | | 18.7525 |
| 30 | L15 | −8.321115E+01 | 1.000000E+00 | 846259.2415 | 18.4445 |
| 31 | | 3.708265E+01 | 4.321518E+00 | | 15.1106 |
| 32* | 41 | −2.621787E+01 | 1.000000E+01 | E48R_ZEON | 14.9862 |
| 33 | 66 | 1.000000E+18 | 5.000000E+00 | EFEL2_HOYA | 13.1505 |
| 34 | 65 (2) | 1.000000E+18 | 5.000000E+00 | E48R_ZEON | 12.8395 |
| 35* | 42 | −1.735729E+01 | −5.000000E+00 | E48R_ZEON | 12.6777 |
| 36 | 66 | 1.000000E+18 | −5.000000E+00 | EFEL2_HOYA | 10.7282 |
| 37 | 65 (1) | 1.000000E+18 | −1.000000E+01 | E48R_ZEON | 10.9751 |
| 38* | 43 | 1.233420E+01 | −2.900000E+02 | | 12.1912 |
| 39 | S | 1.000000E+18 | | | 869.3374 |

The aspherical surface data of the surface numbers 32, 35, and 38 are as follows.

| SURFACE NUMBER | 32 | 35 | 38 |
|---|---|---|---|
| Y CURVATURE RADIUS | −26.21787155 | −17.35729427 | 12.33419785 |
| CONIC CONSTANT (K) | 0 | −1 | 0 |
| 4th-ORDER COEFFICIENT (A) | 0.000266042 | 1.8591E−05 | −2.60214E−05 |
| 6th-ORDER COEFFICIENT (B) | −9.37226E−07 | −8.94005E−08 | −3.02228E−07 |
| 8th-ORDER COEFFICIENT (C) | 2.41928E−09 | 9.68681E−10 | 3.26249E−09 |
| 10th-ORDER COEFFICIENT (D) | −2.73361E−12 | −5.18053E−12 | −1.17872E−11 |
| 12th-ORDER COEFFICIENT (E) | 0 | 1.70617E−14 | 0 |
| 14th-ORDER COEFFICIENT (F) | 0 | −2.1489E−17 | 0 |
| 16-ORDER COEFFICIENT (G) | 0 | 0 | 0 |
| 18th-ORDER COEFFICIENT (H) | 0 | 0 | 0 |
| 20th-ORDER COEFFICIENT (J) | 0 | 0 | 0 |

Here, the projection optical system 3B in the comparative example is not provided with power in the bonding surface between the second member portion 66 and the second first-member portion 65(2). Therefore, it is difficult to control a variety of types of aberration in the bonding surface between the second member portion 66 and the second first-member portion 65(2).

Figure 14:
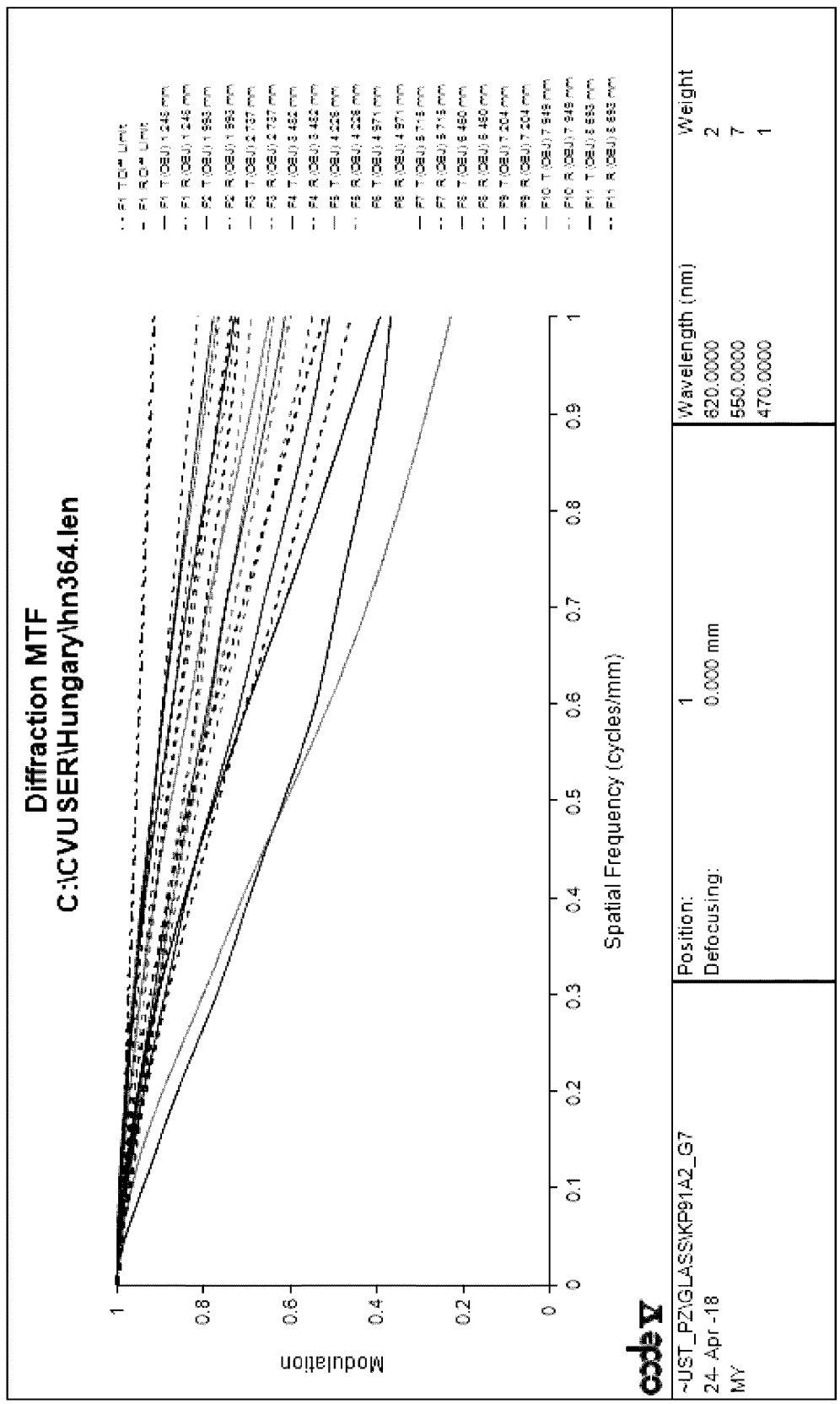
FIG. 14 is a diagram showing MTF at the magnification side of the projection optical system in the comparative example.

FIG. 14 is a diagram showing MTF at the magnification side of the projection optical system 3B in the comparative example. The horizontal axis in FIG. 14 showing the MTF represents a spatial frequency. The vertical axis represents the contrast reproduction ratio. As is understood when comparing FIG. 10 and FIG. 14 with each other, in the projection optical system 3A in the practical example, the deterioration of the resolution is suppressed compared to the projection optical system 3B in the present example.

Other Embodiments

In the optical element 35 of the projection optical system 3A in the practical example, it is possible for the second member portion 66 to be provided with a convexly curved surface at the first first-member portion 65(1) side, and a concavely curved surface at the second first-member portion 65(2) side. According to this configuration, it is possible for the optical element 35 to be provided with power also in the bonding surface between the second member portion 66 and the first first-member portion 65(1). Therefore, it is possible for the optical element 35 to control a variety of types of aberration in the bonding surface between the second member portion 66 and the first first-member portion 65(1) to improve the resolution.

It should be noted that in the projection optical system 3A, it is also possible for the intermediate image 33 to be formed in the first member portion 65 of the optical element 35. Also in this case, since there is no chance for the intermediate image 33 to traverse the bonding surface between the first member portion 65 and the second member portion 66, it is possible to prevent the projection image from deteriorating due to the bonding surface between the first member portion 65 and the second member portion 66.

When using the projection optical system 3 for the imaging device, the imaging element 100 is disposed on the demagnification-side imaging surface of the projection optical system 3 as shown in FIG. 2.

What is claimed is:

1. A projection optical system comprising:
a first optical system; and
a second optical system, wherein
the first optical system and the second optical system are disposed in order from a demagnification side toward a magnification side,
an intermediate image is formed between a demagnification-side imaging surface and a magnification-side imaging surface,
the second optical system is an optical element having a first transmission surface, a reflecting surface, and a second transmission surface in order from the demagnification side toward the magnification side,
the first transmission surface and the reflecting surface are located at one side with respect to an optical axis,
the second transmission surface is located at the other side with respect to the optical axis,
the reflecting surface has a concavely curved surface shape,
the second transmission surface has a convexly curved surface shape protruding toward the magnification side,
the optical element has a first member and a second member different in refractive index from the first member, and
a bonding surface between the first member and the second member has a curved surface shape.

2. The projection optical system according to claim 1, wherein
the intermediate image is located between the first transmission surface and the reflecting surface in the optical element.

3. The projection optical system according to claim 1, wherein
three axes perpendicular to each other are defined as an X axis, a Y axis, and a Z axis, a direction in which the optical axis extends is defined as a Z-axis direction, one side of the Y axis is defined as an upper side, the other side of the Y axis is defined as a lower side, and a plane perpendicular to the X axis and including the Y axis and the Z axis is defined as a Y-Z plane,
an imaginary line connecting an upper intersection point and a lower intersection point to each other is tilted with respect to an imaginary vertical line perpendicular to the optical axis in the Y-Z plane, the upper intersection point being an intersection where an upper peripheral ray of an upper end light beam passing through an upper end in the Y-axis direction in an effective range of the second transmission surface and an upper peripheral ray of a lower end light beam passing through a lower end in the Y-axis direction in the effective range on the Y-Z plane, and the lower intersection point being an intersection where a lower peripheral ray of the upper end light beam and a lower peripheral ray of the lower end light beam on the Y-Z plane.

4. The projection optical system according to claim 1, wherein
the second member is higher in heat resistance than the first member, and
a flux diameter of a ray entering the optical element becomes smallest in the second member.

5. The projection optical system according to claim 1, wherein
the intermediate image is located in the second member.

6. The projection optical system according to claim 1, wherein
the first transmission surface, the reflecting surface, and the second transmission surface are provided to the first member.

7. The projection optical system according to claim 1, wherein
a material of the first member is resin.

8. The projection optical system according to claim 1, wherein
a material of the second member is glass.

9. The projection optical system according to claim 1, wherein
the optical element has an aperture.

10. The projection optical system according to claim 1, wherein
at least one of the first transmission surface, the reflecting surface, and the second transmission surface is an aspherical surface.

11. A projection-type image display device comprising:
the projection optical system according to claim 1; and
an image formation section configured to form a projection image on the demagnification-side imaging surface.

12. A projection-type image display device comprising:
the projection optical system according to claim 2; and
an image formation section configured to form a projection image on the demagnification-side imaging surface.

13. A projection-type image display device comprising:
the projection optical system according to claim 3; and
an image formation section configured to form a projection image on the demagnification-side imaging surface.

14. A projection-type image display device comprising:
the projection optical system according to claim 4; and
an image formation section configured to form a projection image on the demagnification-side imaging surface.

15. A projection-type image display device comprising:
the projection optical system according to claim 5; and
an image formation section configured to form a projection image on the demagnification-side imaging surface.

16. A projection-type image display device comprising:
the projection optical system according to claim 6; and
an image formation section configured to form a projection image on the demagnification-side imaging surface.

17. A projection-type image display device comprising:
the projection optical system according to claim 7; and
an image formation section configured to form a projection image on the demagnification-side imaging surface.

18. A projection-type image display device comprising:
the projection optical system according to claim 8; and
an image formation section configured to form a projection image on the demagnification-side imaging surface.

19. A projection-type image display device comprising:
the projection optical system according to claim 10; and
an image formation section configured to form a projection image on the demagnification-side imaging surface.

20. An imaging device comprising:
the projection optical system according to claim 1; and
an imaging element disposed on the demagnification-side imaging surface.

* * * * *